United States Patent [19]

Layer et al.

[11] 4,252,735

[45] Feb. 24, 1981

[54] STABLE AQUEOUS ALKALI METAL ALUMINATE SOLUTIONS

[75] Inventors: William O. Layer, Kirkland; Siddiq A. Khan, Brossard, both of Canada

[73] Assignee: Handy Chemicals Limited, La Prairie, Canada

[21] Appl. No.: 951,011

[22] Filed: Oct. 13, 1978

[51] Int. Cl.³ .............................................. C07F 5/06
[52] U.S. Cl. ........................... 260/448 C; 260/429 R; 260/429 K; 260/429.3; 260/429.5; 260/429.7; 260/429.9; 260/435 R; 423/265; 423/268
[58] Field of Search ............................... 423/265, 268; 260/448 C

[56] References Cited

U.S. PATENT DOCUMENTS

| | | | |
|---|---|---|---|
| 1,157,436 | 10/1915 | Spence et al. | 423/265 |
| 2,345,134 | 3/1944 | Lindsay et al. | 423/265 |
| 2,734,796 | 2/1956 | Ashley et al. | 423/265 |
| 2,749,316 | 6/1956 | Coates | 423/265 |
| 3,656,889 | 4/1972 | Olewinski | 423/265 |
| 4,007,252 | 2/1977 | Burroughs | 423/265 |

*Primary Examiner*—Helen M. S. Sneed

[57] ABSTRACT

The specification discloses a method of stabilizing aqueous alkali metal aluminate solutions against precipitation of solids and/or the development of a cloudy appearance over a period of standing. The method comprises dissolving hydrated alumina and an alkali metal hydroxide in an aqueous medium in an amount sufficient to produce an aqueous solution containing at least 30% by weight of dissolved solids. The dissolved solids are then reacted in the presence of at least 0.02% by weight of an oligomeric or monomeric surfactant containing groups capable of bonding chemically to the aluminate thus produced. The resulting aluminate solution is found to be stable for a period of several months at least, and thus has a long shelf life making it attractive for use in a variety of industries.

21 Claims, No Drawings

STABLE AQUEOUS ALKALI METAL ALUMINATE SOLUTIONS

This invention relates to a process for preparing stable aqueous alkali metal aluminate solutions and to the solutions thus formed. More particularly, the invention relates to a process for preparing alkali metal aluminate solutions which are stable over long periods of time against the precipitation of solids, gelation, the development of a cloudy appearance and the like.

Alkali metal aluminates are used in a variety of forms in many industries. As just a small example, they are used as sizing agents or precipitants in the paper industry, coagulating agents in water purification treatment and, in general, as flocculating agents in the purification of liquids having small quantities of impurities.

The most common alkali metal aluminate employed is sodium aluminate, but potassium aluminate and lithium aluminate are also used in a number of applications.

Although alkali metal aluminates have been in widespread use for many years, one particular difficulty encountered in their use has persistently defied solution. The difficulty is that aqueous solutions of alkali metal aluminates, and particularly those containing more than 30% by weight of solids, tend to form a precipitate of metal salts or become cloudy or partly gelatinous after only a short period of time. When this occurs, the solutions can often no longer be used or are less effective in most applications. Therefore, unless they are stabilized in some manner, the solutions must be used within a very short time of their preparation. This is clearly a serious disadvantage because most industries require chemicals which are stable over a long period of time so that they can be stored in reasonable quantities and used as and when desired.

Attempts have, of course, been made in the past to overcome this difficulty of aluminate solutions. One such attempt is disclosed in Canadian Pat. No. 758,940 issued on May 16, 1967 and assigned to Nalco Chemical Company. This patent disclosed the formation of alkali metal aluminate solutions containing at least 30% by weight of the aluminate, by dissolving hydrated alumina and an alkali metal hydroxide in water in a ratio falling within a very specific range and then adding to the solution at least 0.1% by weight of a polyhydroxy organic stabilizer. However, the resulting solutions are not stable for particularly long periods of time.

Even when solid aluminates in powder form are employed to avoid the storage problems of aqueous solutions, storage difficulties are still encountered in that powdered aluminates, being hygroscopic, tend to become lumpy so that their solubility is reduced and accurate measurement of quantities becomes difficult. Moreover, even when the powders are in free-flowing form, the aluminates dissolve without uniformity in aqueous solution. Thus, the use of powdered aluminates necessarily introduces an uneconomic and troublesome step of dissolving the powders immediately prior to use.

An attempt to overcome the difficulties of employing powdered sodium aluminate is disclosed in U.S. Pat. No. 2,345,134 issued on Mar. 28, 1944 and assigned to National Aluminate Corporation. This patent discloses the preparation of a powdered solid sodium aluminate containing up to 5% of an organic stabilizing agent. A variety of polyhydroxy organic compounds are suggested as the stabilizing agent. The object of this prior invention is to form a powdered aluminate through a drying process from a pre-stabilized aqueous solution of sodium aluminate. However, we have found that the viscosity of concentrated solutions prepared from the powder is highly dependent on the ambient temperature and it is therefore extremely difficult to handle and transport the product below normal temperatures.

The stabilizer and clarifying agents previously employed with aluminate solutions appear to be chemicals which are merely added to the solutions and remain therein without any significant chemical reaction taking place between the additives and the aluminates. Such stabilizers have never been especially effective and do not enhance the reactivity or desired effects of the aluminates themselves. Moreover, they do not prevent the aluminate solutions from becoming cloudy in appearance over a period of time. In view of these difficulties, therefore, it is an object of the present invention to provide aqueous solutions of alkali metal aluminates which are stable against precipitation, gel formation or the development of a cloudy appearance over reasonably long periods of time.

According to one aspect of the invention there is provided a process for preparing a stabilized aqueous solution of an alkali metal aluminate containing at least 30% by weight of dissolved solids, which comprises: reacting said alkali metal aluminate in an alkaline aqueous medium in the presence of a catalyst with at least 0.02% of its weight of a water soluble oligomeric or monomeric surfactant which is stable against decomposition in the reaction conditions, the amount of alkali metal aluminate with respect to the amount of aqueous medium being sufficient to provide said solids content of at least 30% by weight.

The reaction between the alkali metal aluminate and the surfactant is preferably carried out immediately after the preparation of the alkali metal aluminate by digesting hydrated alumina in an aqueous alkali metal hydroxide solution. Desirably, the same reaction medium is employed, i.e., the alkali metal aluminate is not separated from the reaction medium prior to reaction with the surfactant.

In at least the preferred forms of the invention, not only are the aluminate solutions stabilized against precipitation and the like, but it is also found that the reactivity of the aluminate is enhanced, the solutions have low viscosities, the viscosities are relatively unaffected by changes of temperature of the solutions, and the concentrated solutions can easily be diluted. The latter fact makes it possible to add preferred concentrated solutions according to the invention directly into process streams in many industries because the rapid dilution and dispersion enables the aluminate to be available for reaction in a very short space of time.

The mechanism by which the aluminates are stabilized in this invention is not clearly known, but it is believed that the oligomeric or monomeric surfactants chemically bond to metal salts present in solution and to the aluminate ions. Since the oligomeric surfactants contain a number of ionic groups in their polymer chains, they are very effective in solubilizing and dispersing the aluminates and other salts present. Also, because of the chemical bonding, the effect of the stabilizers is relatively permanent and unaffected by changes of temperature and other variables.

Since the effective charge of the aluminate ions is increased by the oligomeric or monomeric surfactants, the interfacial tension between the ions is reduced.

The preferred oligomeric surfactants used in the invention have a chain of carbon atoms with appendant polar groups. The groups can be cationic, anionic or there may be a mixture of both (i.e., the surfactant may be polyionic).

The preferred surfactants have carboxyl or hydroxyl groups in the molecule.

Using the process of the invention, it is possible to prepare sodium aluminate solutions containing, for example, 45% by weight of sodium aluminate in which the ratio of $Na_2O$ to $Al_2O_3$ is about 1.185:1.0 and which have viscosities of 270 SSU at 90° F. and 450 SSU at 60° F. with a specific gravity of 1.53. Such solutions are found to be stable for periods of at least three months.

The invention will be described in more detail in the following disclosure in which particular reference is made to preferred embodiments of the invention.

STARTING MATERIALS

Oligomeric and Monomeric Surfactants

First of all, it should be noted that there is a lack of precision in the polymer art regarding the use of the terms "monomer" and "oligomer". Often a compound described as a monomer appears from its formula to be an oligomer. Moreover, the term oligomer is used to describe compounds having molecular weights up to 5000. In the following, the terms used in the prior art are employed to describe surfactants that can be used in the present invention, even although these terms may not appear strictly accurate in some cases.

The oligomeric surfactants which can be used in the method of the present invention preferably include any oligomeric or monomeric surfactants containing a radical capable of chemically bonding with the aluminate preferably produced by the reaction of the hydrated alumina and the alkali metal hydroxide, provided the surfactant is stable under the conditions of temperature and alkalinity employed in the preparation of the aluminate. The preferred compounds, however, are the oligomers and monomeric surfactants listed as follows. The oligomers have molecular weights of 200 to 5000 and preferably 200 to 2000.

(I) Oligomers represented by the formula $$R-S-\left[\begin{array}{cc} R_1 & R_2 \\ | & | \\ C-C \\ | & | \\ H & X \end{array}\right]_a - \left[\begin{array}{cc} R_3 & R_4 \\ | & | \\ C-C \\ | & | \\ H & Y \end{array}\right]_b -H$$

wherein R is a straight or branched chain primary, secondary, or tertiary alkyl group having from 5 to 20 carbon atoms; $R_1$ and $R_3$ are hydrogen, methyl, ethyl or —COOH; $R_2$ and $R_4$ are hydrogen, methyl, ethyl, —COOH or —CH$_2$COOH; Y is a strongly polar group selected from the group consisting of —COOH, —CONH$_2$, —OCH$_3$, —OC$_2$H$_5$ and —CH$_2$OH; X is a different polar group selected from the group consisting of the foregoing strongly polar groups and —COOC$_2$-H$_4$OH, —COOC$_3$H$_6$OH, —CONHCH$_2$OH, —CONHCH$_3$, —CONHC$_2$H$_5$, —CONHC$_3$H$_7$, —COOCH$_3$, —COOC$_2$H$_5$, —CN, —OOCH$_3$ and —OOCC$_2$H$_5$; a+b is from 2 to 50; and

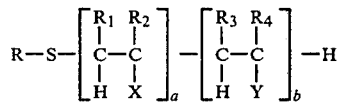

is from 0.05 to 0.6; and, where the oligomer has at least one carboxylic acid group, the said group may be in the form of the free acid or the alkaline salt thereof.

These oligomers are disclosed in U.S. Pat. No. 3,839,405 issued on Oct. 1, 1974 and assigned to Uniroyal Inc. Specific examples of the oligomers represented by the general formula and the method of preparation of the oligomers are fully set out in the U.S. Patent. Basically, however, it can be stated that the compounds are prepared by reacting an alkyl mercaptan with one or more α,β double-bonded monomers.

The compounds are disclosed in the U.S. Patent as being useful surface active agents, emulsifiers or thickeners. However, of course, there is no disclosure of the use of surface active agents of this type in stabilizing aluminate solutions by their reaction with the aluminates.

(II) Oligomers represented by the formula

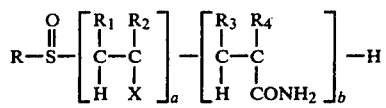

wherein R is straight chain primary, branched chain primary, secondary, or tertiary alkyl group having from 5 to 20 carbon atoms; $R_1$ and $R_3$ are hydrogen, methyl or ethyl; $R_2$ is H, methyl or —CH$_2$COOH and $R_4$ is hydrogen, methyl or ethyl, X is —COOH, —COOC$_3$-H$_4$OH, —COOC$_3$H$_6$OH, —COOCH$_3$ or —COOC$_2$H$_5$; a+b is from 2 to 50;

a/(a+b)

is greater than zero and not greater than 0.6; and, where said oligomer contains at least one carboxylic acid group, the said group may be in the form of the free acid or a water soluble salt thereof.

These oligomers, and their methods of preparation, are fully disclosed in U.S. Pat. No. 3,772,382 issued on Nov. 13, 1973 and assigned to Uniroyal Inc.

(III) Oligomers reprsented by the formula

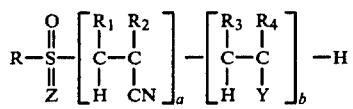

wherein R is a straight chain primary, branch chain primary, secondary, or tertiary alkyl group having from 5 to 20 carbon atoms or mixtures thereof; $R_1$ and $R_3$ are hydrogen, methyl, ethyl or —COOH; $R_2$ and $R_4$ are hydrogen, methyl, ethyl, —COOH or —CH$_2$COOH; Y is —COOH, —CONH$_2$, —OCH$_3$, —OC$_2$H$_5$, or —CH$_2$OH; a+b is from 4 to 50, a/(a+b) is greater than 0 and not greater than 0.6; Z is oxygen or nothing; and where said emulsifier contains at least one carboxylic acid group, the said group being in the form of the free acid or a water-soluble salt thereof.

These oligomers, and their methods of preparation, are fully disclosed in U.S. Pat. No. 3,776,874 issued on Dec. 4, 1973 and assigned to Uniroyal Inc.

(IV) Oligomers represented by the formula:

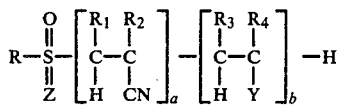

wherein R is straight chain primary, branched chain, primary, secondary, or tertiary alkyl group having from five to 20 carbon atoms; $R_1$ and $R_3$ are hydrogen, methyl, ethyl or —COOH; $R_2$ and $R_4$ are hydrogen, methyl, ethyl or —COOH or —CH$_2$COOH; Y is —COOH, —CONH$_2$—OCH$_3$, —OC$_2$H$_5$ or —CH$_2$OH; a+b is from 2 to 50; a/(a+b) is greater than zero and not greater than 0.6; and Z is oxygen or nothing; and, where said oligomer contains at least one carboxylic acid group, the said group may be in the form of the free acid or a water soluble salt thereof.

These oligomers, and their methods of preparation, are fully disclosed in U.S. Pat. No. 3,668,230 issued on June 6, 1972 and assigned to Uniroyal Inc.

(V) Oligomers represented by the formula

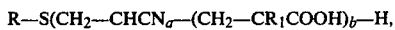

wherein R is a primary or secondary alkyl group having from six to 12 carbon atoms; $R_1$ is hydrogen or methyl; a+b is from 4 to 50 and a/(a+b) is from 0 to 0.6; said oligomer being present in the form of a water-soluble salt selected from the group consisting of the ammonium, lower alkyl, alkanol substituted ammonium, and alkyl metal salts thereof.

These oligomers, and their methods of preparation, are fully disclosed in U.S. Pat. No. 3,632,466 issued on Jan. 4, 1972 and assigned to Uniroyal Inc.

(VI) Oligomers having the formula

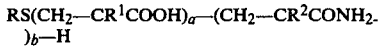

wherein R is a straight chain primary (normal), branched chain primary or secondary alkyl group having from 6 to 20 carbon atoms, or mixtures thereof, $R^1$ is hydrogen, methyl or CH$_2$COOH, $R^2$ is hydrogen or methyl, a+b is from 6 to 50; and a/(a+b) is from 0.075 to 0.40, said oligomer being used in the form of (1) the free acid or (2) is partial or complete salt formed by neutralization with ammonium hydroxide, alkali metal hydroxide, alkaline earth metal hydroxide, Group IV heavy metal oxide or hydroxide or lower alkyl or alkanol substituted amines.

These oligomers, and their methods of preparation, are fully disclosed in U.S. Pat. No. 3,498,943 issued on Mar. 3, 1970 and assigned to Uniroyal Inc.

(VII) Oligomers having the formula

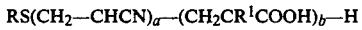

wherein R is a straight chain primary (normal), branched chain primary or secondary alkyl group having from 6 to 12 carbon atoms or mixtures thereof, $R^1$ is hydrogen or methyl, a+b is from 4 to 50, and a/(a+b) is from 0 to 0.6, said oligomer being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

These oligomers, and their methods of preparation, are fully disclosed in U.S. Pat. No. 3,498,942 issued on Mar. 3, 1970 and assigned to Uniroyal Inc.

The oligomers (I) to (VII) above can be described as alkyl sulfide, sulfoxide or sulfone terminated compounds having a backbone of from 4 to 100 carbon atoms in addition to those of the alkyl group. Attached to the oligomeric carbon atoms are appendant polar groups. Usually, at least one polar group is present for each two carbon atoms in the chain.

It is to be noted that the formulae given for these oligomers are not intended to depict the actual structure of the final compounds in as much as the structural units shown in the brackets in the formulae are randomly distributed in the molecule.

The oligomeric surfactants which are employed in this invention are either water soluble themselves or can be readily made soluble in water by conversion to salts. The conversion may be achieved with the appropriate metal oxide, metal hydroxide, ammonium hydroxide, amine, etc. while it is found that ammonium, substituted ammonium and alkali metal salts are generally the most soluble in water.

Alkaline earth metal and group (III) heavy metal salts may also be soluble particularly in the case of the oligomers having two strongly hydrophilic groups.

Sodium, ammonium, zinc, lower alkyl and alkanol substituted amine salts are also of particular interest. Those skilled in the art may also readily determine which salt derivatives of the oligomeric surfactants that are water soluble may be employed.

The most preferred of the oligomers listed above can be represented by the formula

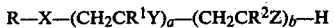

wherein R is a straight or branched chain primary, secondary or tertiary alkyl group having from 5 to 20 carbon atoms $R^1$ and $R^2$ may be the same or different and each represents hydrogen, methyl, ethyl, —COOH or —CH$_2$COOH, X is S,

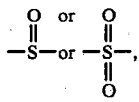

Z is a strongly polar group selected from the group consisting of COOH, CONH$_2$, OCH$_3$, OC$_2$H$_5$ and CH$_2$OH, Y is a different polar group selected from the group consisting of any one of the groups represented by Z or

| —COOC$_2$H$_4$OH | —COOC$_3$H$_6$OH | —CONHCH$_2$OH |
| —CONHCH$_3$ | —CONHC$_2$H$_5$ | —CONHC$_3$H$_7$ |
| —COOC$_2$H$_5$ | —CN | —COOCH$_3$ |
| —OOCCH$_3$ and | —OOCC$_2$H$_5$ | | a+b is from 2 to 50, a/(a+b) is from 0.05 to 0.6, and when the oligomer has at least one carboxylic acid group, the group may be in the form of the free acid or a salt thereof.

The oligomers indicated above can be obtained from Uniroyal Chemical, a division of Uniroyal Inc. (U.S.A.)

under the trade marks POLYWET FA-3, FA-4, FA-5 (free acid forms).

(VIII) Monomeric surfactants having the formula

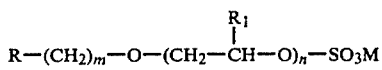

where R is a radical selected from the group consisting of vinyl, allyl, propenyl and isopropenyl, $R_1$ is either hydrogen, methyl, or ethyl, m is an integer of from 1 to 10, n is either zero or an integer of from 1 to 100, and M is ammonium or an alkali metal.

These monomerics, and their method of preparation are fully disclosed in U.S. Pat. No. 3,875,202 issued on Apr. 1, 1975 and assigned to Alcolac Inc.

(IX) Hydroxyethyl methacrylate monomer having a low diester content and having the structure formula

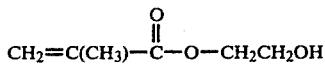

has also been found suitable as a stabilizing agent. The pendant hydroxyl groups of the monomer, are found to impart a polarity suitable for the stabilization of alkali metal aluminates. These free hydroxyl groups provide the vacant sites to stabilize the alumina ions in the aqueous solutions.

The hydroxyethyl methacrylate indicated above can be obtained from Alcolac under the trade mark SIPOMER HEM.

The monomers such as dimethylaminoethyl methacrylate which incorporate only amino groups, or acrylamide based monomers such as N-methylolacrylamide which provide a combination of conjugated vinyl unsaturation with a reacative hydroxymethyl group, are not found suitable for stabilization of aqueous aluminate solutions. Although the aluminates can be prepared, formation of precipitates is observed after a week. Similar results are found when 2-acrylamido-2-methylpropane sulfonic acid type monomer is used.

The potassium salts of oligomeric surfactants sold under the trade mark KX-3, KX-4, and KX-5 by Uniroyal Inc. are found to form unstable solutions of sodium aluminate.

Generally, these stabilizers are ineffective because they themselves are unstable in the conditions of temperature and alkalinity encountered during the preparation of sodium aluminate and the stabilizing reaction.

ALUMINA HYDRATE

The alumina hydrate used in the method of the invention can be any commercially available form of the material. Good stability can be obtained even with the use of an impure grade, although it is preferable to use a grade of intermediate purity.

Very good results have been obtained with the use of alumina hydrate sold under the Trade Mark H-10 (sold by Alcan Chemical Products, Aluminum Company of Canada Limited) which is a cream coloured, free-flowing powder in the reactive alpha trihydrate form having the following chemical analysis;

| Constituents (% by weight) | max | H-10 typical |
|---|---|---|
| Soda, $Na_2O$ | 0.50 | 0.33 |
| Iron Oxide, $Fe_2O_3$ | 0.035 | 0.022 |
| Silica, $SiO_2$ | 0.025 | 0.016 |
| Free moisture | 0.1 | 0.02 |
| Insolubles in $H_2SO_4$ | 0.15 | 0.08 |
| Loss in Ignition | 36.0 | 34.5 |
| Alumina, $Al_2O_3$ | 63.0 | 65.0 |

High purity alumina can of course be used, for example the alumina sold by Alcan Chemical Products under the Trade Marks C31 and C731, although no particular advantage is thereby obtained.

ALKALI METAL HYDROXIDE

The alkali metal hydroxide employed in the method of the invention is entirely conventional and any such material of reasonably purity from any convenient source can be employed.

CATALYST

A catalyst is preferably required for the reaction between the oligomeric or monomeric surfactant and the aluminate solution.

The catalyst employed is preferably a free radical initiator. For example, peroxides, persulfates and azo compounds. The appropriate selections of an initiator for the given monomer are well known to those skilled in the art.

Specific examples include ammonium persulfate, alkali metal and alkaline earth metal persulfates and the alkyl peroxides such as lauroyl peroxide, cyclohexyl peroxides and t-butyl peroxide. Satisfactory results can also be obtained with organic peroxides, hydroperoxides, hydrogen peroxide, diazo compounds such as diazo bis (isobutyronitrile) and water soluble persulfates.

Catalytic amounts of initiator are used, preferably 0.05 gram to 5.0 grams per total mole depending upon the particular initiator and monomer system. While lesser amounts may be used, it will decrease the conversion. Greater amounts give no significant advantage.

Various free radical precursors in order of activity are as follows:

| | |
|---|---|
| Hydrogen Peroxide | $HO-OH \rightarrow HO\cdot + HO\cdot$ |
| Organic Peroxides | $RO-OR^1 \rightarrow RO\cdot + R^1O\cdot$ |
| Hydroperoxides | $RO-OH \rightarrow RO\cdot + HO\cdot$ |
| Peracids | $RCOOOH \rightarrow R\cdot + HO\cdot + CO_2$ |
| Peresters | $RCOOOR^1 \rightarrow R\cdot + R^1O\cdot + CO_2$ |
| Diacyl Peroxides | $(RCOO)_2 \rightarrow R\cdot + R\cdot + 2CO_2$ |
| Persulfates | $S_2O_8^= \rightarrow SO_4\cdot + SO_4\cdot$ |
| Azo Compounds | $RN=NR^1 \rightarrow R\cdot + R^1\cdot + N_2$ |

Organic Redox Initiators (Catalysts) Cumyl hydroperoxide benzene sulfinic acid
$2C_6H_5C(CH_3)_2OOH + C_6H_5SO_2H \rightarrow$
$2C_6H_5C(CH_3)_2O\cdot + C_6H_5SO_3H + H_2O$
or Benzoyl peroxide - benzene phosphinic acid.
$(C_6H_5CO_2)O + C_6H_5P(OH)_2 \rightarrow$
$2C_6H_5\cdot + C_6H_5P(O)$
$(OH)_2 + 2CO_2$ Other means of initiation (catalysts) may involve ionic or high energy mechanisms.

Electron transfer mechanisms may also be mentioned involving free radical precursors and reducing agents (reduction-oxidation or redox).

THE REACTION

In the process of the invention, the oligomeric or monomeric surfactant is reacted with the aluminate either as the aluminate is formed or thereafter. The aluminate can be prepared by reacting an alkali metal hydroxide with hydrated alumina in an aqueous medium at an elevated temperature. The oligomeric or monomeric surfactant and catalyst are preferably added during the reaction or shortly after the digestion of the alumina. Preferably, the oligomer and catalyst are added after the alumina has been completely digested and the solution has clarified.

The temperature required for the digestion of the alumina is in the same range as the temperature required for the reaction of the aluminate with the oligomeric or monomeric surfactant so, when the oligomer or monomer is added after the solution clarifies, the temperature of the solution can be maintained at the same level while the oligomer or monomer and catalyst are added and allowed to react.

The time period required for the surfactant to react is usually a few minutes to several hours, e.g., ¼ to 4 hours. Most preferably, the solution is allowed to react for approximately thirty minutes, and then the solution can be adjusted to the desired specific gravity by the addition of hot water and then maintained at the reaction temperrature for several more minutes.

Both the digestion of the alumina and the reaction of the surfactant are preferably carried out within the temperature range of 220° to 260° F. The reaction commences at about 220° F. and, although temperatures above 260° F. can be employed, this is undesirable as the water evaporates rapidly from the aqueous medium and must therefore be made up. The most preferred temperature range is 220° to 240° F.

The heating of the aqueous medium to the reaction temperature can be achieved by any suitable means and strict control of the temperature within the stated range is not essential, provided the temperature remains high enough for the reaction to take place.

The temperature range for the reaction may be lower than the stated range when special techniques are employed. For example, ultra-sonic mixing of the reaction medium permits the use of temperatures of about 150° F. Although such embodiments are not preferred in many applications because of the high capital investment required, thorough mixing can be achieved by this method and the method could possibly be advantageous in certain special applications.

The molar ratios of the alkali metal hydroxide to the hydrated alumina are preferably chosen to provide a small excess of the alkali, e.g., about 10%. The stochiometrical amounts can be employed, if desired, but, on the commercial scale, the small excess of alkali makes up for the inevitable variations of the amounts of hydroxide encountered in practice. Larger excesses of the alkali can be used, if required, but are not required as in many of the prior art methods.

The amount of oligomer or monomer as the surfactant is preferably not greater than 10% by weight and the most preferred range for the oligomer, or monomer is 0.02 to 2% by weight of the total reaction mixture.

The amount of catalyst should preferably be at least 0.02 by weight of the reaction mixture. The preferred amount is 0.05 gram to 5.0 grams per total mole depending upon the particular initiator and monomer.

For those applications where it is desired to obtain a colorless alkali metal aluminate, the colour of the reaction product can be removed by oxidizing the organic coloring matter normally associated with aluminum trihydrate. Conventional oxidizing agents can be employed, for example peroxide, persulfate, or hypochlorite.

The oxidizing step may be carried out when the reaction product is concentrated at the end of the process. However, it may be advantageous to dilute the concentrate somewhat in order to prevent rapid exothermic reactions from taking place. The oxidizing reaction is usually carried out at 108° to 150° F. and the amount of oxidizing agent may suitably be in the order of 0.03 to 2% by weight, based on the weight of the metal aluminate.

The process of the invention may employ ammonium or potassium persulfate as both a catalyst and a decoloring agent at a reaction temperature of 220° to 260° F.

An additional preferred step in the method of the invention, if appropriate, involves the filtration of the product through carbon or any other suitable filtering material. For example, after the oxidation step, the concentrate may be filtered through a filter screen or other support coated with a pre-selected filter aid such as carbon. As an alternative, the filter aid, such as carbon, may be strained with the aluminate liquor for a period of time before filtration.

Powdered sodium aluminate can be conventionally produced from the liquid product of the present invention. This is normally done by concentration and then drying. These operations can normally be carried out at a higher temperature than is possible with prior art products because of the greater stability of the product of the invention.

As noted above, while the exact mechanism by which the stability of the aluminate is achieved in the present invention is not exactly known, it is clear that the stabilizing oligomeric or monomeric compound reacts with the alkali metal aluminate hence making the associated molecules more dispersible.

Examples of the method of the present invention are provided in the following for the purpose of illustration only, i.e., the Examples are not to be construed as limiting the scope of the invention which is to be determined by reference to the appendant claims.

EXAMPLE 1

475 Grams of 50% w/w caustic soda solution and 129.0 grams of water were mixed together in a 1000 ml glass beaker equipped with a laboratory stirrer. 5.0 Grams of sodium gluconate as a clarifier were added to this solution and were completely dissolved with mixing. The solution was heated to 212° F. and 373.0 grams of alumina hydrate powder sold under the trade mark H-10 was added slowly. The temperature was raised to 238° F. and maintained thereat.

The alumina hydrate powder dissolved in approximately 10 minutes which was apparent by the solution becoming clear.

To the above solution 17:00 grams of stabilizer solution prepared as under was added: 5 Grams of 50% w/w caustic soda solution was added to 10 grams of water in a glass beaker. 2.0 Grams of an oligomeric surfactant sold under the trade mark POLYWET FA-4 was added to this solution and completely dissolved.

One minute after the addition of stabilizer solution, 6.0 grams of 16.7% wt. solution of ammonium persulfate (1.0 gram ammonium persulfate in 5.0 grams of water) was added very slowly.

While the ammonium persulfate was being added, the heating was stopped. After the complete addition of ammonium persulfate, the solution was heated to 238° F. and maintained at 238° F. for 30 minutes.

The specific gravity of the solution was then adjusted to 1.50 by the addition of hot water as required. The solution was maintained at 238° F. for an additional 15 minutes.

The solution was filtered at 238° F. through a Whatman filter paper No. 41. A light gold color clear solution was obtained.

The filtered solution was allowed to cool to ambient temperature (75° F.). The solution made by the above method remained clear without precipitation three months after preparation.

The chemical analysis of the solution was found to have the molar ratio of $Na_2O$ to $Al_2O_3$ of 1.15 to 1.0.

EXAMPLE 2

440 Grams of 50% w/w caustic soda solution and 137 grams of water were mixed together in a 1000 ml glass beaker equipped with a laboratory stirrer. 5.0 Grams of sodium gluconate were added to this solution and were completely dissolved through mixing.

The solution was heated to 212° F. and 400.0 grams of alumina hydrate powder sold under the trade mark H-10 was added slowly. The temperature was raised to 238° F. and maintained.

The alumina hydrate powder dissolved in approximately 10 minutes which was apparent by the solution becoming clear.

To the above solution 17 grams of stabilizer solution prepared as under was added:

5 Grams of 50% w/w caustic soda solution was added to 10 grams of water in a glass beaker. 2.0 Grams of oligomeric surfactant sold under the trade mark POLYWET FA-4 was added to this solution and completely dissolved.

One minute after the addition of stabilizer solution, 6.0 grams of 16.7% wt. solution of ammonium persulfate (1.0 gram ammonium persulfate was being added, the heating was stopped. After the complete addition of ammonium persulfate, the solution was heated to 238° F. and maintained at 238° F. for 30 minutes.

The specific gravity of solution was then adjusted to 1.50 by addition of hot water as required. The solution was maintained at 238° F. for additional 15 minutes.

The solution was filtered at 238° F. through a Whatman filter paper No. 41. A light gold color clear solution was obtained.

The filtered solution was allowed to cool to ambient temperature (75° F.). The solution made by the above method remained clear without precipitation three months after preparation.

The chemical analysis of the solution was found to have the molar ratio of $Na_2O$ to $Al_2O_3$ of 1.05 to 1.0.

EXAMPLE 3

The procedure of example 1 was repeated in the same manner as outlined in Example 1, incorporating the following changes.

Digestion of alumina hydrate was carried out using 110.0 grams of water, 475.0 grams of 50% caustic soda solution, 5.0 grams of sodium gluconate and 373.0 grams of alumina hydrate grade H-10.

The oligomeric surfactant solution of FA-4 prepared contained 20.0 grams of FA-4, 5.0 grams of 50% caustic soda solution and 10.0 grams of water.

The catalyst solution used with 10.0 grams of ammonium persulfate in 50.0 grams of water.

The resulting sodium aluminate solution was found to have improved clarity when compared with the solution obtained in Example 1. It was also found to be stable over three months.

EXAMPLE 4

The procedure of Example 1 was repeated in the identical manner as in Example 1 incorporating the following changes.

Digestion amounts of alumina hydrate H-10, 50% caustic soda and water were kept the same as in Example 3.

The monomeric surfactant used was the sodium salt of a short chain vinyl sulfonate which is available under the trade name of COPS I obtained from Alcolac Inc. 2.0 grams of COPS I were added into 5.0 grams of 50% caustic soda solution and 10.0 grams of water.

The catalyst solution used was 1.0 grams of ammonium persulfate in 5.0 grams of water.

The resulting sodium aluminate thus prepared was found to be completely clear and no precipitates were observed after three months.

EXAMPLE 5

Example 4 was repeated however, instead of using COPS I, the ammonium salt of an acrylic sulfate available under the trade name COPS II from Alcolac Inc. was used.

The resulting sodium aluminate was found to have similar characteristics as found in Example 4.

EXAMPLE 6

Example 4 was repeated; however, instead of using COPS I, hydroxylethyl methacrylate monomer available under the trade name of SIPOMER HEM from Alcolac Inc. was used.

The results obtained were similar as obtained in Example 4.

EXAMPLE 7

300 Grams of 94 to 97% powdered sodium aluminate (obtained from Canada Colors and Chemicals Ltd.) were dissolved in 676 grams of water in a 1000 ml glass beaker equipped with a laboratory stirrer. The solution was heated to 238° F. and maintained at 238° F. for 20 minutes.

To the above solution, 2.0 grams of hydroxylethyl methacrylate monomer available under the trade name of SIPOMER HEM from Alcolac Inc. were added along with 1.0 gram of ammonium hydroxide.

One minute after the addition of SIPOMER HEM, 6.0 grams of 16.7% wt. solution of ammonium persulfate (1.0 gram ammonium persulfate in 5.0 grams of water) was added slowly.

While the ammonium persulfate was being added, the heating was stopped. After the complete addition of ammonium persulfate, the solution was heated to 238° F. and maintained at 238° F. for 30 minutes.

The solution was filtered at 238° F. through a Whatman filter paper No. 41. A light gold color clear solution was obtained.

The filtered solution was allowed to cool to ambient temperature (75° F.). The solution made by the above method remained clear without precipitation three months after preparation.

The chemical analysis of the solution was found to have the molar ratio of Na$_2$O to Al$_2$O$_3$ of 1.136 to 1.0.

EXAMPLE 8

Example 1 was repeated, but instead of using POLYWET FA-4 (trade mark) as the surfactant, the partially hydrolyzed ammonium salt of an oligomeric surfactant sold under the trade mark POLYWET AX-4 (available from UniRoyal Inc.) was employed.

The same results as in Example 1 were obtained.

The embodiments of the invention in which an enclusive property or priviledge is claimed are defined defined as follows:

1. A process for preparing a stable aqueous solution of an alkali metal aluminate containing at least 30% by weight of dissolved solids and having a molar ratio of M$_2$O to Al$_2$O$_3$ in the range 1.05–1.185:1 wherein M represents an alkali metal atom, which comprises: reacting said alkali metal aluminate in an alkaline aqueous medium at a temperature in the range of 220°–240° F. with 0.02% to 10% of its weight of a water soluble oligomeric or monomeric surfactant which is stable against decomposition in the reaction conditions in the presence of an effective amount of a catalyst selected from the group consisting of free radical initiators, organic redox initiators, free radical precursors and reducing agents, in order to cause said surfactant to chemically bond with said alkali metal alminate, the amount of alkali metal aluminate with respect to the amount of aqueous medium being sufficient to provide said solids content of at least 30% by weight, and the amount of alkali with respect to said alkali metal aluminate being sufficient to provide said molar ratio of 1.05–1.185:1.

2. A process according to claim 1 wherein the oligomeric surfactant has a molecular weight of 200 to 5000 and the following formula

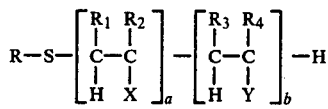

wherein R is a straight or branched chain primary, secondary or tertiary alkyl group having from 5 to 20 carbon atoms; R$_1$ and R$_2$ are hydrogen, methyl, ethyl or —COOH; R$_2$ and R$_4$ are hydrogen, methyl, ethyl, —COOH, or CH$_2$COOH; Y is a strongly polar group selected from the group consisting of —COOH, —CONH$_2$, —OCH$_3$, —OC$_2$H$_5$ and —CH$_2$OH; X is a different polar group selected from the group consisting of the foregoing strongly polar groups and —COOC$_2$-H$_4$OH, —COOC$_3$H$_6$OH, —CONHCH$_2$OH, —CONHCH$_3$, —CONHC$_2$H$_5$, —CONHC$_3$H$_7$, —COOCH$_3$, —COOC$_2$H$_5$, —CN, —OOCCH$_3$ and —OOCC$_2$H$_5$; a+b is from 2 to 50; and a/(a+b)

is from 0.05 to 0.6; and, where the oligomer has at least one carboxylic acid group, the said group may be in the form of the free acid or the alkaline salt thereof.

3. A process according to claim 1 wherein the oligomeric surfactant has a molecular weight of 200 to 5000 and the following formula

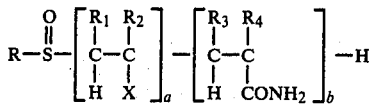

wherein R is straight chain primary, branched chain primary, secondary, or tertiary alkyl group having from 5 to 20 carbon atoms; R$_1$ and R$_3$ are hydrogen, methyl or ethyl; R$_2$ is H, methyl or —CH$_2$COOH and R$_4$ is hydrogen, methyl or ethyl, X is —COOH, —COOC$_3$-H$_4$OH, —COOC$_3$H$_6$OH, —COOCH$_3$ or —COOC$_2$H$_5$; (a+b) is from 2 to 50;

a/(a+b)

is greater than zero and not greater than 0.6; and, where said oligomer contains at least one carboxylic acid group, the said group may be in the form of the free acid or a water soluble thereof.

4. A process according to claim 1 wherein the oligomeric surfactant has a molecular weight of 200 to 5000 and the following formula

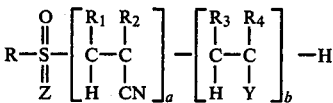

wherein R is a straight chain primary, branch chain primary, secondary, or tertiary alkyl group having from 5 to 20 carbon atoms or mixtures thereof, R$_1$ and R$_3$ are hydrogen, methyl, ethyl or —COOH; R$_2$ and R$_4$ are hydrogen, methyl, ethyl, —COOH or —CH$_2$COOH; Y is —COOH, —CONH$_2$, —OCH$_3$, —OC$_2$H$_5$, or —CH$_2$OH; (a+b) is from 4 to 50, a/(a+b) is greater than 0 and not greater than 0.6; Z is oxygen or nothing; and where said emulsifier contains at least one carboxylic acid group, the said group being in the form of the free acid or a water-soluble salt thereof.

5. A process according to claim 1 wherein the oligomeric surfactant has a molecular weight of 200 to 5000 and the following formula

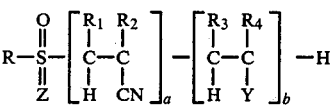

wherein R is straight chain primary, branched chain primary, secondary, or tertiary alkyl group having from five to 20 carbon atoms; R$_1$ and R$_3$ are hydrogen, methyl, ethyl or —COOH; R$_2$ and R$_4$ are hydrogen, methyl, ethyl, —COOH, or —CH$_2$COOH; Y is —COOH, —CONH$_2$, —OCH$_3$, —OC$_2$H$_5$, or —CH$_2$OH; a+b is from 2 to 50; a/(a+b) is greater than zero and not greater than 0.6; and Z is oxygen or nothing; and, where said oligomer contains at least one carboxylic acid group, the said group may be in the form of the free acid or a water soluble salt thereof.

6. A process according to claim 1 wherein the oligomeric surfactant has a molecular weight of 200 to 5000 and the following formula

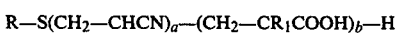

wherein R is a primary or secondary alkyl group having from six to 12 carbon atoms; $R_1$ is hydrogen or methyl; a+b is from 4 to 50 and a/(a+b) is from 0 to 0.6; said oligomer being present in the form of a water-soluble salt selected from the group consisting of the ammonium, lower alkyl, alkanol substituted ammonium, and alkali metal salts thereof.

7. A process according to claim 1 wherein the oligomeric surfactant has a molecular weight of 200 to 5000 and the following formula

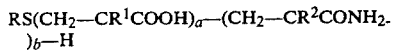
$$RS(CH_2-CR^1COOH)_a-(CH_2-CR^2CONH_2-)_b-H$$

wherein R is a straight chain primary (nromal), branched chain primary or secondary alkyl group having from 6 to 20 carbon atoms, or mixtures thereof, $R^1$ is hydrogen, methyl or —CH$_2$COOH, $R^2$ is hydrogen or methyl, a+b is from 6 to 50; and a/(a+b) is from 0.075 to 0.40, said oligomer being used in the form of (1) the free acid or (2) its partial or complete salt formed by neutralization with ammonium hydroxide, alkali metal hydroxide, alkaline earth metal hydroxide, Group IV heavy metal oxide or hydroxide or lower alkyl or alkanol substituted amines.

8. A process according to claim 1 wherein the oligomeric surfactant has a molecular weight of 200 to 5000 and the following formula

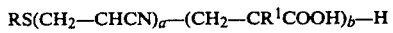
$$RS(CH_2-CHCN)_a-(CH_2-CR^1COOH)_b-H$$

wherein R is a straight chain primary (normal), branched chain primary or secondary alkyl group having from 6 to 12 carbon atoms or mixtures thereof, $R^1$ is hydrogen or methyl, a+b is from 4 to 50, and a/(a+b) is from 0 to 0.6, said oligomer being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

9. A process according to claim 1 wherein the monomeric surfactant has the following formula

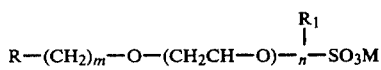
$$R-(CH_2)_m-O-(CH_2CH-O)-_n-SO_3M$$
$$\phantom{R-(CH_2)_m-O-(CH_2CH}|\phantom{-O)-_n-SO_3M}$$
$$\phantom{R-(CH_2)_m-O-(CH_2CH}R_1$$

wherein R is a radical selected from the group consisting of vinyl, allyl, propenyl and isopropenyl, $R_1$ is either hydrogen, methyl or ethyl, m is an integer of from 1 to 10, n is a numeral ranging from zero to 100, and M is a salt forming cation selected from the class consisting of ammonium and alkali metal.

10. A process according to claim 1 wherein the oligomeric surfactant has a molecular weight of 200 to 5000 and the following formula

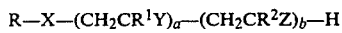
$$R-X-(CH_2CR^1Y)_a-(CH_2CR^2Z)_b-H$$

wherein R is a straight or branched chain primary, secondary or tertiary alkyl group having from 5 to 20 carbon atoms; $R^1$ and $R^2$ may be the same or different and each represents hydrogen, methyl, ethyl, —COOH or —CH$_2$COOH, X is S,

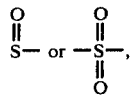
$$-S- \text{ or } -\overset{O}{\underset{O}{\overset{\|}{S}}}-,$$

Z is a strongly polar group selected from the group consisting of —COOH, —CONH$_2$, —OHC$_3$, —OC$_2$H$_5$ and —CH$_2$OH, Y is a different polar group selected from the group consisting of any one of the groups represented by Z or

| —COOC$_2$H$_4$OH | —COOC$_3$H$_6$OH | —CONHCH$_2$OH |
|---|---|---|
| —CONHCH$_3$ | —CONHC$_2$H$_5$ | —CONHC$_3$H$_7$ |
| —COOC$_2$H$_5$ | —CN | —COOCH$_3$ |
| —OOCCH$_3$ and | —OOCC$_2$H$_5$ | | a+b is from 2 to 50, a/(a+b) is from 0.05 to 0.6, and when the oligomer has at least one carboxylic acid group, the group may be in the form of the free acid or a salt thereof.

11. A process according to claim 1 wherein said surfactant has the formula

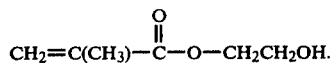
$$CH_2=C(CH_3)-\overset{O}{\overset{\|}{C}}-O-CH_2CH_2OH.$$

12. A process according to claim 1 wherein said alkali metal aluminate is produced by digesting hydrated alumina in an aqueous alkali metal hydroxide solution.

13. A process according to claim 12 wherein said hydrated alumina and alkali metal hydroxide are reacted at a temperature in the range of 220° to 260° F.

14. A process according to claim 12 wherein said hydrated alumina and alkali metal hydroxide are reacted at a temperature in the range of 220°-240° F.

15. A process according to claim 12 wherein the alkali metal hydroxide is selected from the group consisting of sodium hydroxide, lithium hydroxide and potassium hydroxide.

16. A process according to claim 12 wherein the alumina is reacted with sodium hydroxide.

17. A process according to claim 1 wherein the catalyst is a radical type initiator.

18. A process according to claim 17 wherein the radical type initiator is a persulfate or a peroxide.

19. A process according to claim 1 wherein the catalyst is selected from ammonium persulfate, potassium persulfate, diazo bis (isobutyronitrile) or a peroxide.

20. A process according to claim 1 wherein the catalyst is present in an amount of 0.5 to 5.0 grams per total mole.

21. A stable aqueous solution of an alkali metal aluminate containing at least 30% by weight of dissolved solids and having a molar ratio of M$_2$O to Al$_2$O$_3$ in the range 1.05-1.185:1 wherein M represents an alkali metal atom, wherein said alkali metal aluminate is chemically bonded to 0.2% to 10% of its weight of a water-soluble oligomeric or monomeric surfactant, when prepared by the process of claim 1.

* * * * *